United States Patent
Mayer et al.

(10) Patent No.: US 7,249,926 B1
(45) Date of Patent: Jul. 31, 2007

(54) DRIVEWAY TRUCK RESTRAINT

(75) Inventors: William B. Mayer, Sussex, WI (US); Douglas M. Cull, Hartland, WI (US); Gregory L. Kwolek, Lindenhurst, IL (US); Adam B. Peltier, Hustisford, WI (US); James P. Hagen, Hartland, WI (US)

(73) Assignee: Nova Technology International, LLC, Menomonee Falls, WI (US)

( * ) Notice: Subject to any disclaimer, the term of this patent is extended or adjusted under 35 U.S.C. 154(b) by 387 days.

(21) Appl. No.: 10/941,558

(22) Filed: Sep. 15, 2004

(51) Int. Cl.
*B65G 67/02* (2006.01)

(52) U.S. Cl. .................................................. 414/401

(58) Field of Classification Search ................ 414/401
See application file for complete search history.

(56) References Cited

U.S. PATENT DOCUMENTS

| | | | | |
|---|---|---|---|---|
| 1,949,295 | A * | 2/1934 | Dean ........................... | 404/11 |
| 2,624,307 | A * | 1/1953 | Caffrey ....................... | 116/63 R |
| 3,349,531 | A * | 10/1967 | Watson ........................ | 52/296 |
| 3,688,439 | A * | 9/1972 | Doxsee et al. ................. | 49/35 |
| 4,576,508 | A * | 3/1986 | Dickinson ...................... | 404/6 |
| 4,589,813 | A | 5/1986 | Hagen et al. | |
| 4,601,502 | A * | 7/1986 | Van Dyke .................. | 292/252 |
| 4,634,334 | A * | 1/1987 | Hahn et al. .................. | 414/401 |
| 4,674,941 | A * | 6/1987 | Hageman ..................... | 414/401 |
| 4,735,542 | A | 4/1988 | Fisher et al. | |
| 4,759,678 | A * | 7/1988 | Hageman ..................... | 414/401 |
| 4,830,563 | A * | 5/1989 | Yeakle ........................ | 414/401 |
| 4,946,330 | A * | 8/1990 | Pedersen et al. ............. | 414/401 |
| 4,964,777 | A * | 10/1990 | Kleynjans et al. ........... | 414/401 |
| 4,969,792 | A * | 11/1990 | Ellis et al. .................... | 414/401 |
| 5,054,237 | A * | 10/1991 | Kapala et al. ................. | 49/35 |
| 5,203,663 | A * | 4/1993 | Ruppe ......................... | 414/401 |
| 5,212,846 | A * | 5/1993 | Hahn ........................... | 14/69.5 |
| 5,249,905 | A * | 10/1993 | Warner et al. .............. | 414/401 |
| 5,348,437 | A * | 9/1994 | Krupke et al. .............. | 414/401 |
| 5,481,828 | A * | 1/1996 | Kentrotas ....................... | 49/35 |
| 5,597,262 | A * | 1/1997 | Beavers et al. ................. | 404/6 |
| 5,683,219 | A * | 11/1997 | Gilles et al. ................. | 414/401 |

(Continued)

FOREIGN PATENT DOCUMENTS

DE 35 08 856 * 9/1986

(Continued)

OTHER PUBLICATIONS

*Powerhold Truck Restraint System Instructional Manual*, POWERAMP® Systems, Inc., Germantown Wisconsin (Jun. 1993) (Title Page Only).

(Continued)

*Primary Examiner*—James Keenan
(74) *Attorney, Agent, or Firm*—Andrus, Sceales, Starke & Sawall, LLP (57) ABSTRACT

A driveway truck restraint blocks the path of travel of an ICC bar at the back of a truck on a driveway at a loading dock to prevent forward travel of the truck away from the loading dock. The restraint is removably anchored to the driveway in non-cast-in relation without concrete around an encasing column depending downwardly through the driveway into the subgrade. A low profile is provided both above and below grade. A water dam is provide around a cable opening. Simplified, economical installation is provided.

18 Claims, 10 Drawing Sheets

U.S. PATENT DOCUMENTS

| | | | |
|---|---|---|---|
| 6,309,165 B1 * | 10/2001 | Hahn et al. | 414/401 |
| 6,422,783 B1 * | 7/2002 | Jordan | 404/9 |
| 6,545,215 B2 * | 4/2003 | Young et al. | 174/490 |
| 6,805,515 B2 * | 10/2004 | Reale | 404/11 |
| 2003/0192253 A1 * | 10/2003 | Miller et al. | 49/49 |

FOREIGN PATENT DOCUMENTS

GB          2078832     *    1/1982

OTHER PUBLICATIONS

*Challenger Truck Restraint Installation & Operation Manual*; POWERAMP® Systems, Inc., Germantown, WI; three pages (Jun. 1993).

*Automatic Truck Restraint Installation and Operation Manual*; POWERAMP® Systems, Inc., Germantown, WI; two pages (Jun. 1996).

*Owner's Manual*; GWL-2000; RITE HITE®; Serial No. GW201000 and Up; Publication No. 1144-R2 (Oct. 2000) (Title Page Only).

*Owner's Manual*; DOK-LOK® GDL-950 Series; A RITE-HITE® Corp. Vehicle Restraint; RITE HITE® Corporation; Pub. No. 076 (Jun. 1992) (Title Page Only).

*EVR Series*; PIONEER Loading Dock Equipment; two pages (at least as early as Dec. 12, 2000).

*Powerhold SC Truck Restraint Installation and Operation Manual*; POWERAMP® Systems, Inc., Germantown, WI; two pages (Apr. 1995).

*Installation Parts & Owner's Manual*; NOVA Anchor Truck Lock™; Nova Technology International, LLC; Catalog No. TL02 (2002).

*Installation Parts & Owner's Manual*; All Model 300 Series NOVA Truck Lock™; Nova Technology International, LLC; Catalog TL02 (2002).

* cited by examiner

DRIVEWAY TRUCK RESTRAINT

BACKGROUND AND SUMMARY

The invention relates to driveway truck restraints for blocking the path of travel of an ICC bar at the back of a truck on a driveway in front of a loading dock, to block forward travel of the truck away from the loading dock.

Driveway truck restraints are known for engaging the truck's ICC bar, also known as the rear impact barrier or underride guard or rear impact guard. Interstate Commerce Commission regulations dictate a maximum height of 31 inches of the ICC bar above grade, i.e. above the top of the driveway, for older trucks, and a maximum height of 22 inches for newer trucks. Truck restraints must thus have a height in a retracted or release position less than the height of the ICC bar, to permit forward travel of the truck away from the loading dock. Preferably, the retracted height of the restraint is substantially less than the ICC bar, to accommodate various conditions such as underinflated tires, trucks having an air ride suspension which may lower the truck during loading/unloading, a sloped driveway leading to the loading dock, etc. To accommodate these conditions, low profile restraints are known in the prior art, having a height of about 10 inches or less above grade in the retracted release position.

In typical installations known in the prior art, the restraint housing has a hollow vertical column encasing a ram bar and supporting and guiding the ram bar for upward and downward movement into and out of the path of the ICC bar. During installation, a hole is cut in the driveway, and the subgrade therebelow is excavated to allow insertion of the column downwardly thereinto, followed by pouring of concrete into the excavation and the hole in the driveway around the column, such that the column is mounted in cast-in relation. The column extends downwardly to a depth as far as 42 inches below the top surface of the driveway. At this depth, various underground objects may be encountered, including drain tiles, drainage pipes, electrical utility lines, etc. The cast-in restraint housing is not removable nor replaceable nor reusable without destroying a portion of the driveway therearound.

The present invention arose during continuing development efforts directed toward improved driveway truck restraints.

In one aspect, the present invention provides a low profile restraint not only above ground but also below ground. The underground depth requirement is reduced to a range of about 19 to 27 inches below the top surface of the driveway, rather than the above noted 42 inches.

In another aspect, installation cost is reduced, both material and labor, by reducing the noted depth and/or extent of excavation, and by eliminating the need for concrete filling the noted excavation and hole in the driveway.

In another aspect, the restraint housing is readily removable, replaceable and reusable without destroying the driveway or portions of the driveway around the housing. This is desirable to enable the restraint to be mounted at a different location in the future, to meet changing needs, such as a relocated loading dock position, or to be eliminated altogether, for example if the loading dock or building is to be used for a different purpose.

In another aspect, the present restraint is immediately usable, without waiting for concrete to cure.

In a further aspect, a water dam is provided for protection of a cable pulley system. In some implementations, the ram bar cavity is filled with anti-freeze solution. The dam prevents casual water from diluting such anti-freeze solution.

The present invention further provides improvements in ease of installation and in flexibility of use.

DETAILED DESCRIPTION

Prior Art

Figure 1:
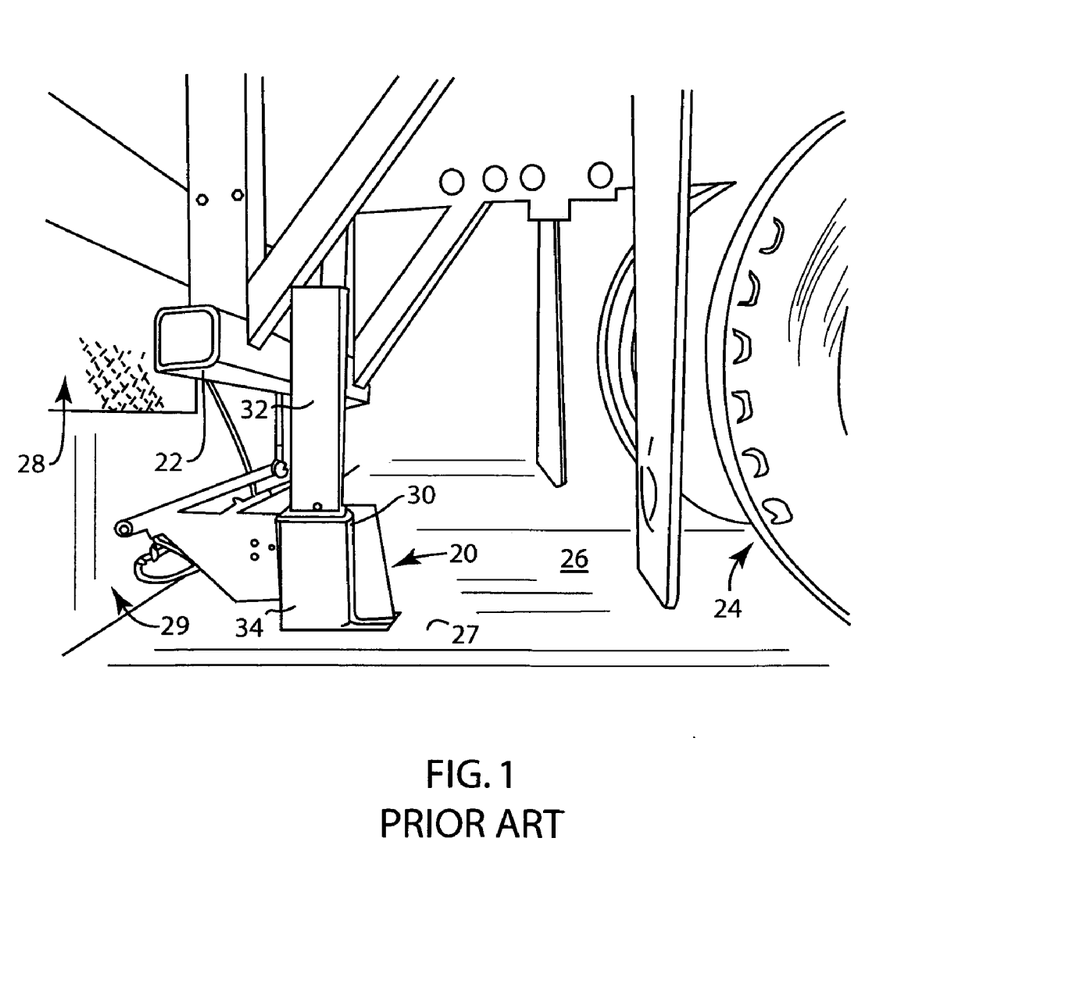
FIG. 1 is a perspective view of a driveway truck restraint known in the prior art.
Figure 2:
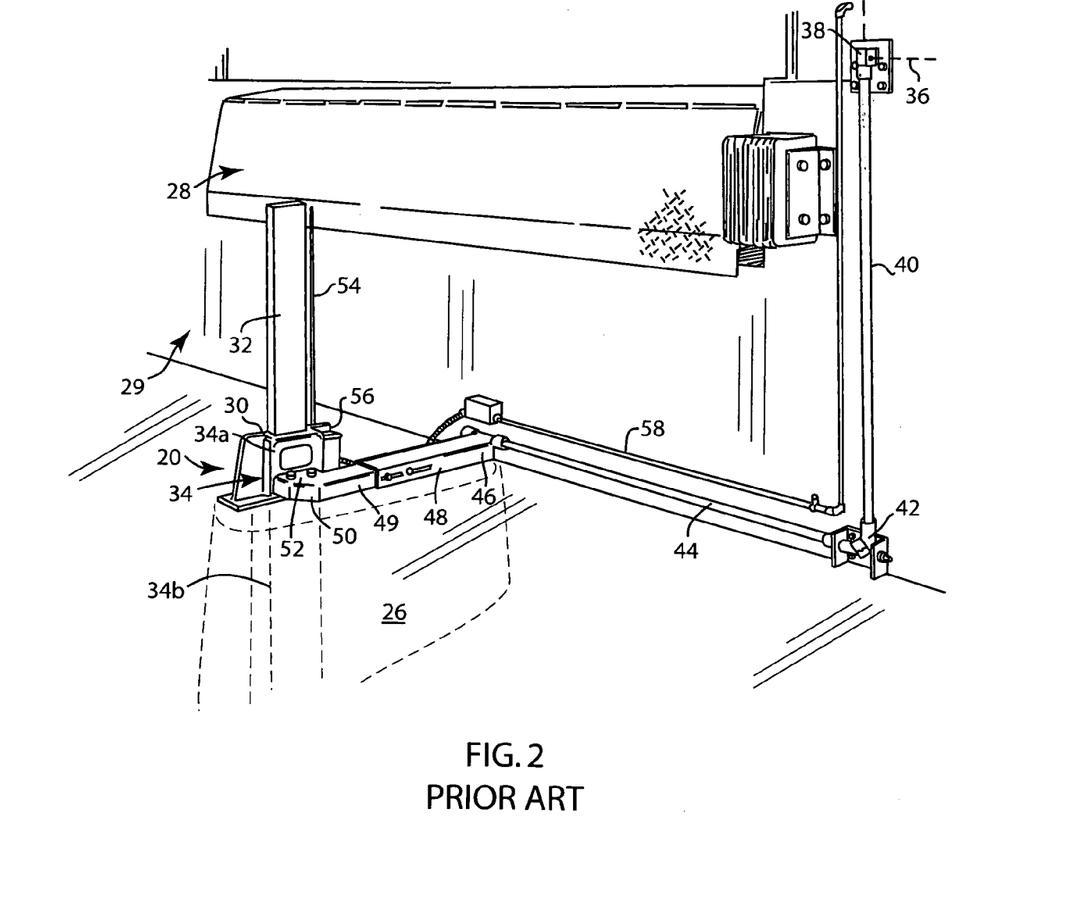
FIG. 2 is a perspective view from another side of a driveway truck restraint known in the prior art.
Figure 3:
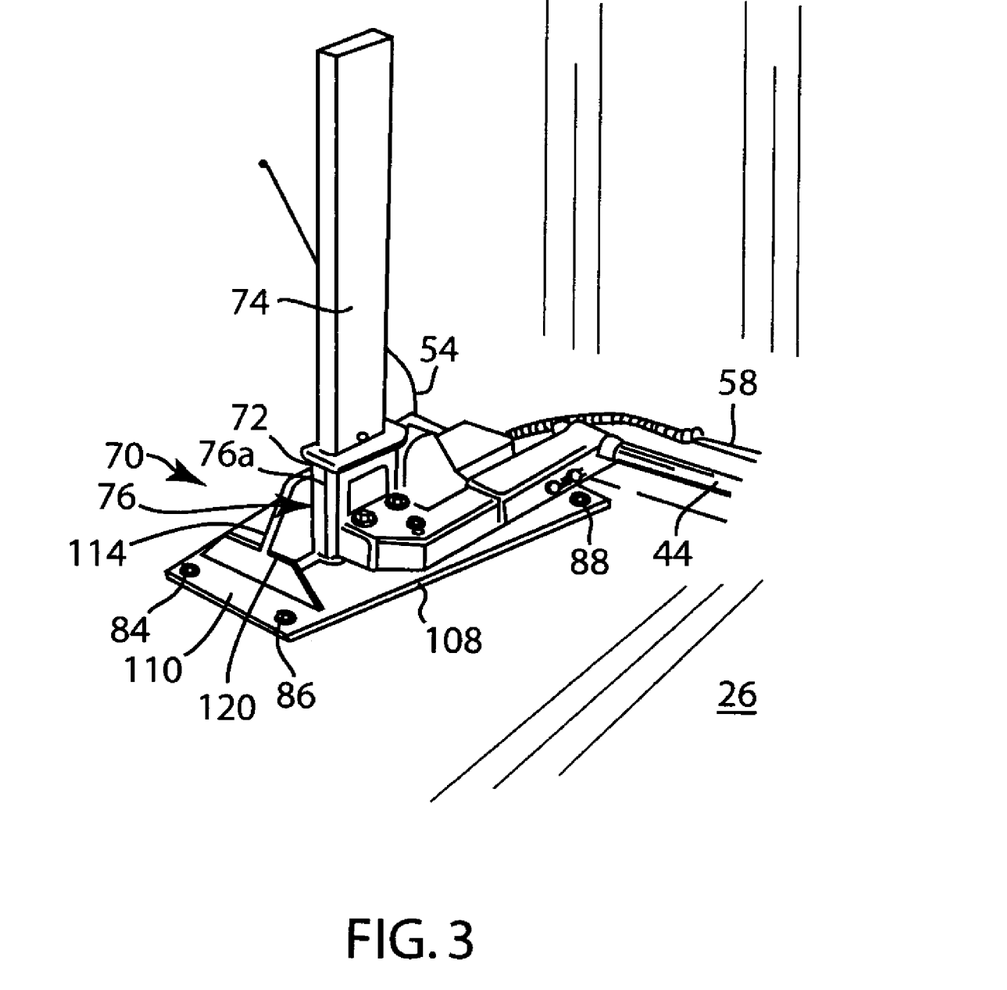
FIG. 3 is a perspective view of a driveway truck restraint in accordance with the present invention.

FIGS. 1 and 2 show a driveway truck restraint 20 for blocking the path of travel of an ICC bar 22 at the back of a truck 24 on a driveway 26 at a loading dock 28 at wall 29. The restraint may be used with other types of loading docks, with or without dock levelers, including open docks and blind docks. The restraint includes a housing 30, and a ram bar 32 supported by the housing and movable to an upwardly extended lock position to block a forward path of travel of ICC bar 22 (rightwardly in FIG. 1) to block forward travel of the truck away from the loading dock, and movable to a downwardly retracted release position permitting forward travel of the truck away from the loading dock. The housing includes a hollow central column 34 encasing and guiding ram bar 32 for vertical rectilinear reciprocal up-down movement therein. Column 34 extends upwardly at upper column portion 34a above the top surface 27 of the driveway to a height of about 10 inches or less, preferably about 7½ inches, above the driveway, to afford the above noted desirable low profile, though other heights are within the scope hereof. Column 34 extends downwardly as show in dashed line at lower column portion 34b into and through the driveway and into the subgrade below the driveway, typically to a depth of about 42 inches below the top surface 27 of the driveway, as noted above. The excavation around column portion 34b in the subgrade and the hole in the driveway are filled with concrete.

A cable and pulley system is provided for raising and lowering ram bar 32, for example as provided by a cable as shown in dashed line at 36 extending from inside the building at the loading dock and then trained around a first pulley (not shown) at junction 38 and then extending downwardly through conduit 40 to another pulley (not shown) at junction 42 and then extending through conduit 44 to another pulley (not shown) at junction 46 and then extending through sleeves 48, 49 to another pulley (not shown) at junction 50 and then extending to another pulley (not shown) at junction 52 at the sidewall of column 34 and then extending to an anchoring point on ram bar 32. Upon retraction or pulling of cable 36 from inside the building ram bar 32 is raised to its upward position. Upon release of pulley 36, ram bar 32 slides downwardly in hollow column 34 by gravity. In some embodiments, a flexible truck sensing wand 54 is pivotally mounted on housing 20 and senses the truck as it backs in to the loading dock, e.g. by being deflected by ICC bar 22, which deflection of wand 54 actuates a switch sensor assembly (not shown) on the housing at 56 which in turn sends an electrical signal through an electrical conductor routed through conduit 58 into the building to trigger an alarm, e.g. audio and/or visual, to alert dock personnel to activate and raise ram bar 32 to its upward position, or to automatically activate same. The structure and operation described thus far are known in the prior art, for example as available from Nova Technology International, LLC, N90 W14507 Commerce Drive, Menomonee Falls, Wis. 53051.

Present Invention

FIGS. 3-10 illustrate the present invention and use like reference numerals from above where appropriate to facilitate understanding.

Figure 4:
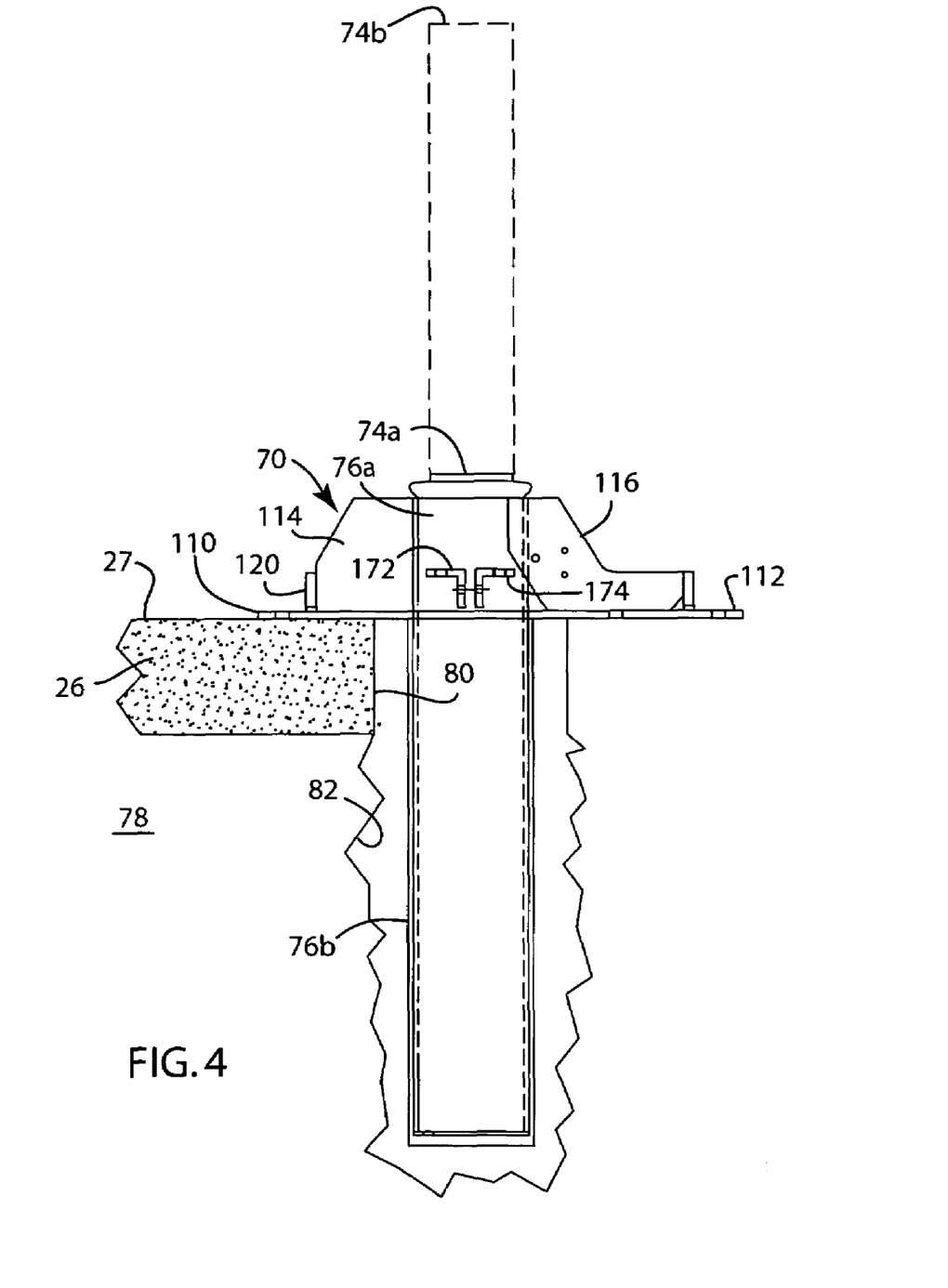
FIG. 4 is a side view partially in section of the driveway truck restraint of FIG. 3 including the underground profile.
Figure 5:
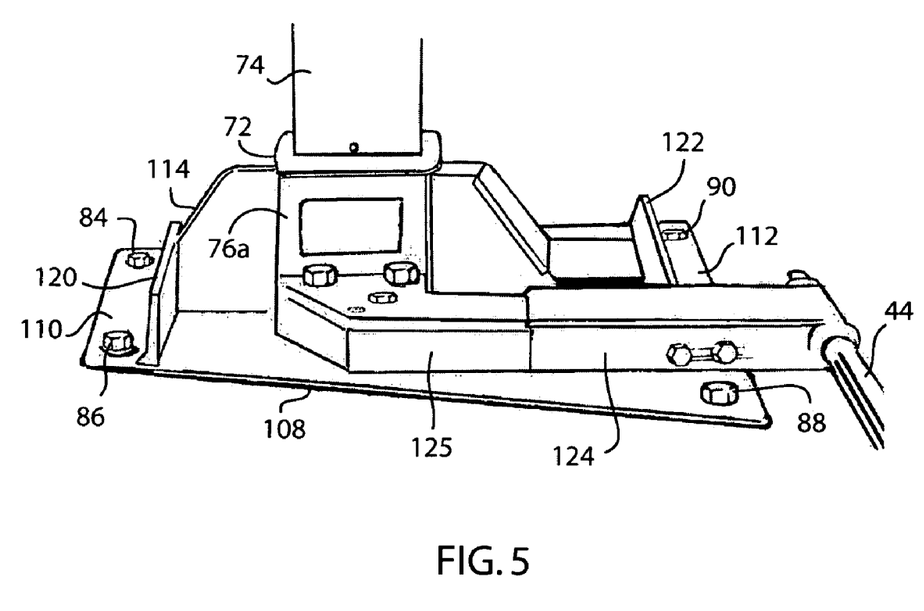
FIG. 5 is a perspective view from the side of the driveway truck restraint of FIG. 3.
Figure 6:
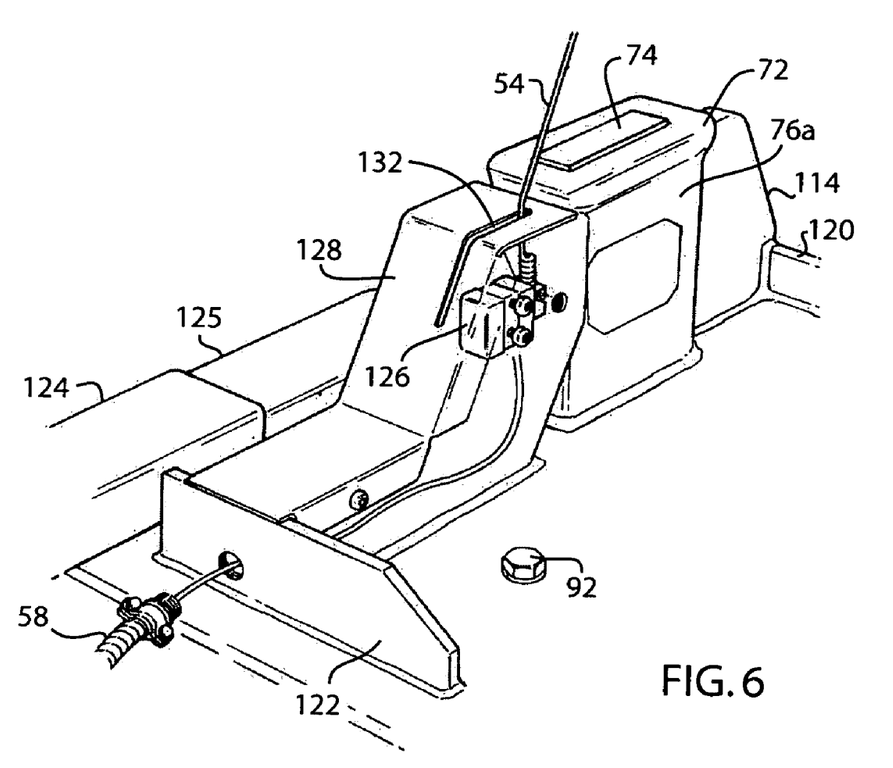
FIG. 6 is a perspective view from the side and rear of the driveway truck restraint of FIG. 3.
Figure 7:
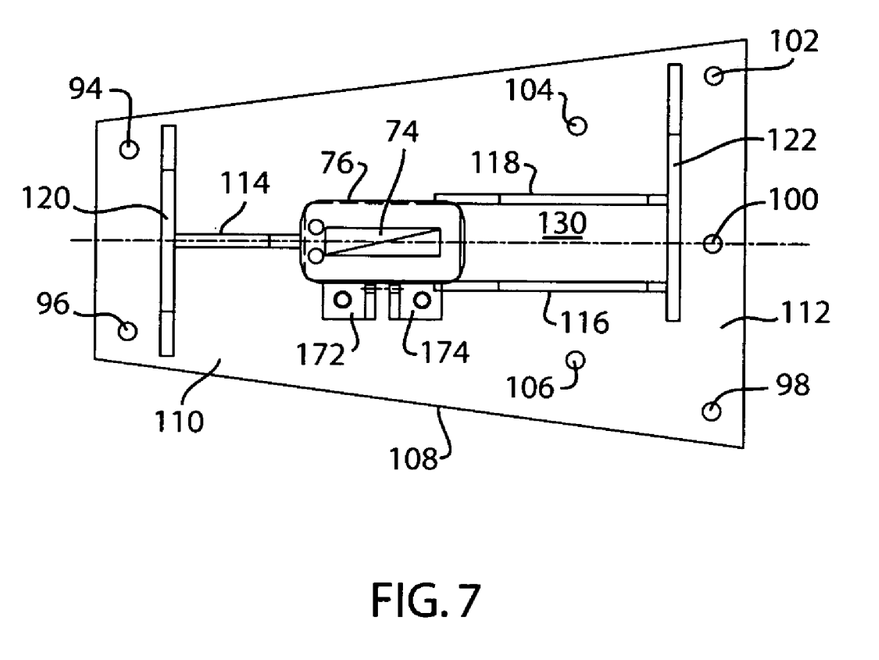
FIG. 7 is a top elevation view of a portion of the driveway truck restraint of FIG. 3.

Driveway truck restraint 70 is provided for blocking the path of travel of ICC bar 22, FIG. 1, at the back of a truck 24 on a driveway 26 at a loading dock 28, as above. Also as above, the restraint may be used with other types of loading docks, with or without dock levelers, including open docks and blind docks. The restraint is provided by a housing 72, and a ram bar 74 supported by the housing and movable to an upwardly extended lock position to block a forward path of travel of the ICC bar, to block forward movement of the truck away from the loading dock, and movable to a downwardly retracted release position permitting forward travel of the truck away from the loading dock. In FIG. 4, ram bar 74 is shown in its downward retracted release position at solid line 74a, and is shown in its upward extended lock position at dashed line 74b. Housing 72 is removably anchored in driveway 26 in non-cast-in relation. The housing includes a central hollow column 76 having an upper section 76a extending upwardly above the driveway to a height less than 10 inches above the top surface 27 of the driveway, and preferably about 7.5 inches. The central hollow column has a lower section 76b, FIGS. 4, 8, extending downwardly into and through and below the driveway and into subgrade 78 therebelow to a depth of about 19 to 27 inches below the top surface 27 of the driveway. A typical driveway thickness is about 6 inches. Hollow column 76 encases and guides ram bar 74 for vertical rectilinear reciprocal up-down movement therein. Column 76 at lower section 76b extends downwardly through and below driveway 26. Ram bar 74 in its downward release position extends downwardly through and below driveway 26. Column 76 extends through driveway 26 in non-cast-in relation and is removable therefrom without destroying surrounding portions of the driveway around column 76. Column 76 at section 76b extends into subgrade 78 in non-cast-in relation and is removable therefrom. During installation, a hole 80 is drilled in the driveway, and the subgrade therebelow is excavated as shown at excavation 82. Column 76 at lower section 76b is inserted downwardly through hole 80 into excavation 84.

Housing 72 is fastened to driveway 26 by an anchoring system, such as by bolts, studs, chemical epoxy, or other anchoring means. In the preferred embodiment, housing 72 is fastened to driveway 26 by bolts or studs such as 84, 86, 88, 90, 92, etc., through fastener holes such as clearance holes or bolt holes such as 94, 96, 98, 100, 102, 104, 106, FIG. 7. The restraint includes a plate 108 having a fore plate section 110 extending from central column 76 horizontally forwardly to a forward set of one or more bolt holes such as 94, 96, and an aft plate section 112 extending from central column 76 horizontally rearwardly to a rearward set of one or more bolt holes such as 98, 100, 102. A brace 114 extends from upper section 76a of the central column forwardly and downwardly to fore plate section 110 adjacent the forward set of bolt holes 94, 96 and compressively resists forward movement of upper section 76a of the column and ram bar 74 in its upward lock position upon engagement of ram bar 74 by ICC bar 22 upon attempted forward travel of truck 24 away from loading dock 28. A pair of braces 116, 118, FIG. 8, extend from upper section 76a of central column 76 rearwardly and downwardly to aft plate section 112 adjacent the rearward set of bolt holes 98, 100, 102 and tensilely resisting forward movement of upper section 76a of the column and ram bar 74 in the upward lock position upon engagement of ram bar 74 by ICC bar 22 upon attempted forward travel of truck 24 away from loading dock 28.

Brace 114 is a longitudinal brace extending forwardly along a longitudinal direction from upper section 76a of central column 76 and downwardly to fore plate section 110. A lateral cross brace 120 extends laterally along fore plate section 110 along a direction transverse to the noted longitudinal direction and maintains fore plate section 110 flat along a laterally extended span. Bolt holes 94 and 96 are spaced along the noted transverse direction. Cross brace 120 is structurally connected, preferably by welding, the parts being steel, to longitudinal brace 114 and extends in opposite transverse directions therefrom and spans the pair of bolt holes 94 and 96. Longitudinal brace 114 is preferably welded to central column 76 and to plate 108 and to lateral cross brace 120, all such components being steel. Cross brace 120 has a width along the noted laterally extended span along the noted transverse direction substantially greater than the width of upper section 76a of central column 76 along the noted transverse direction.

Braces 116 and 118 are a pair of longitudinal braces extending rearwardly along the noted longitudinal direction from upper section 76a of central column 76 and downwardly to aft plate section 112. A lateral cross brace 122, FIGS. 8, 7, extends laterally along aft plate section 112 along the noted transverse direction and maintains aft plate section 112 flat along a laterally extended span. Cross brace 122 is structurally connected to longitudinal braces 116 and 118, preferably by welding, such parts being steel. Cross brace 122 spans between longitudinal braces 116 and 118 and extends therebeyond in opposite transverse directions. Bolt holes 98, 100, 102 are spaced along the noted transverse direction, and cross brace 122 spans bolt holes 102 and 100, but not bolt hole 98, to enable passage along such space of a sleeve such as 124, FIG. 8, through which cable 36 extends. Bolt holes 98 and 102 are adjacent respective corners of aft plate section 112, and bolt hole 100 is at an intermediate portion of aft plate section 112. Bolt holes 98 and 102 are spaced laterally outwardly of longitudinal braces 116, 118. Longitudinal braces 116, 118 have truck sensing wand 54 mounted therebetween at switch assembly 126, FIG. 8. A cover 128, FIGS. 8, 6, laterally spans longitudinal braces 116 and 118 and covers the gap 130 therebetween to protect switch assembly 126 in such gap. Cover 128 has a longitudinal slit 132 through which wand 54 extends.

Figure 8:
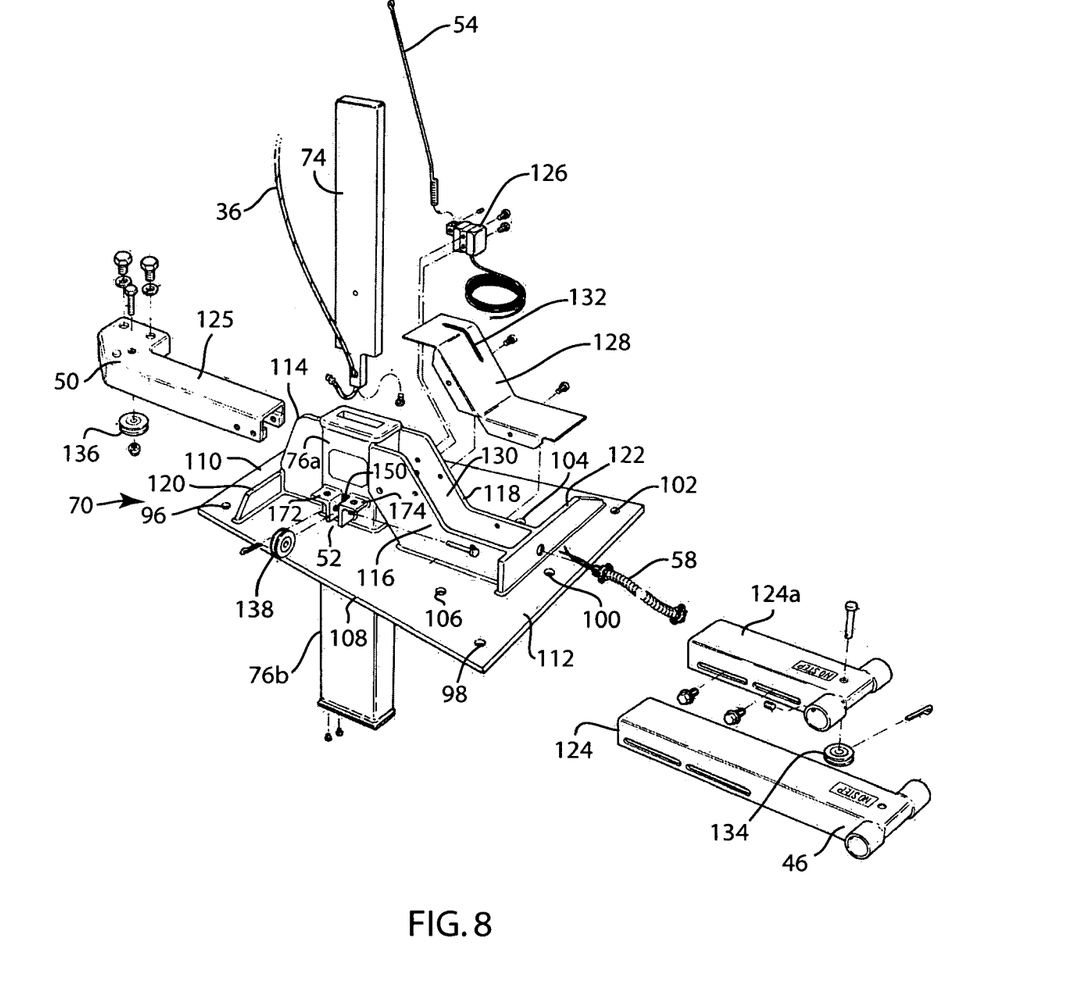
FIG. 8 is an exploded perspective view of the driveway truck restraint of FIG. 3.

FIG. 8 further shows portions of the cable and pulley system, including pulley 134 at junction 46, FIGS. 2, 8, pulley 136 at junction 50, and pulley 138 at junction 52. Sleeves 124 and 125 are comparable to sleeves 48 and 49 of FIG. 2. FIG. 8 also shows an alternate sleeve 124a where it is desired to space the restraint a closer distance from the dock. In the preferred embodiment, driveway truck restraint 70 is anchored only to driveway 26 and not to the loading dock wall 29.

In the preferred installation method, a hole is formed through driveway 26 at 80, FIG. 4, a portion of subgrade 78 below the hole is excavated as shown at 82, and lower section 76b of central column 76 is inserted downwardly into hole 80 through the driveway such that column section 76b and ram bar 74 in its lower release position extend into excavation 82. Housing 72 is then removably anchored to driveway 26 without casting column 76 in driveway 26 nor in subgrade 78. The housing is anchored by bolting it to the driveway. Restraint 70 may be removed by unbolting housing 72 from the driveway.

Figure 9:
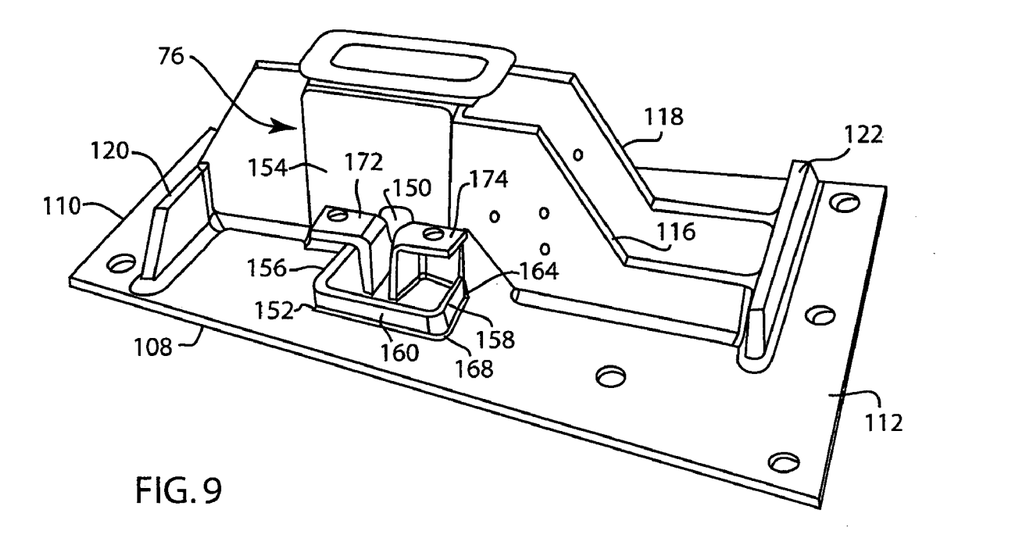
FIG. 9 is a perspective view like a portion of FIG. 8 and shows a further embodiment.
Figure 10:
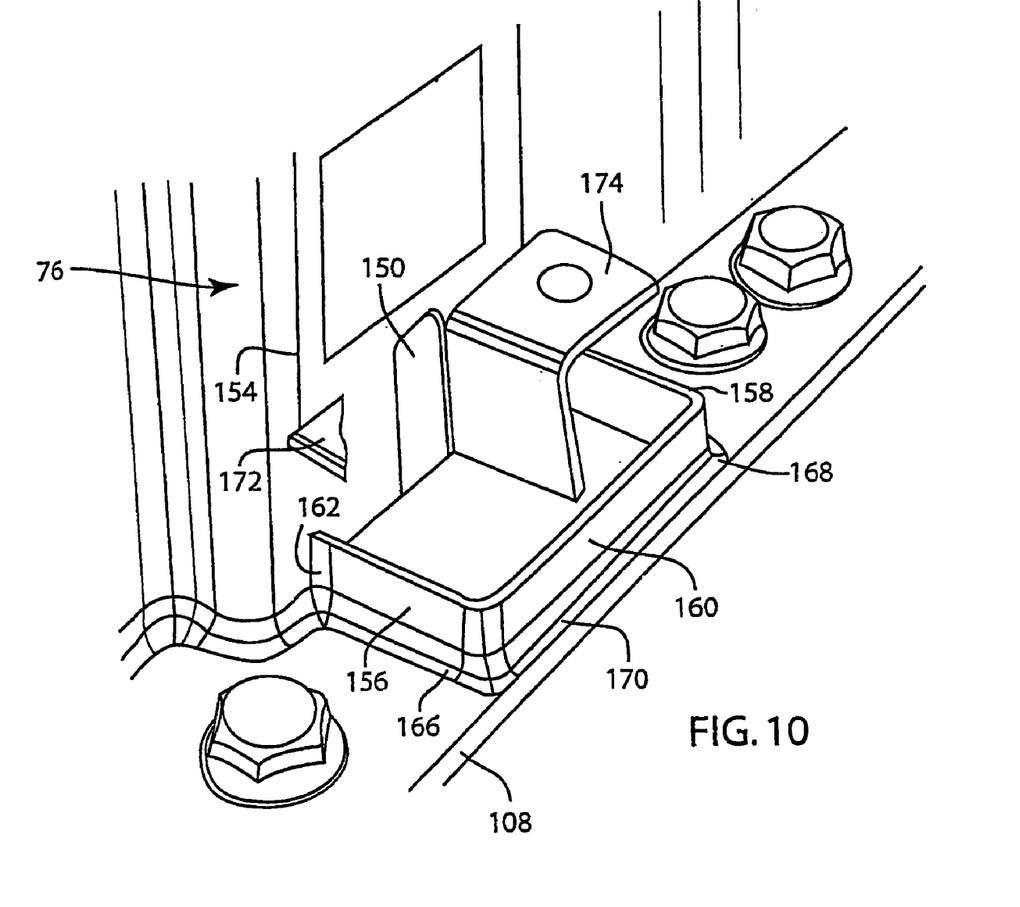
FIG. 10 is a perspective view of a portion of FIG. 9.

FIGS. 9 and 10 show a further embodiment. As noted above, ram bar 74 is raised and lowered by a cable system having a cable 36 extending through a cable opening 150 in column 76. A water dam 152 is provided on plate 108 blocking water inflow to cable opening 150. Column 76 has a sidewall 154 having the noted cable opening 150 extending laterally therethrough. Dam 152 has first and second leg segments 156 and 158 extending laterally outwardly from sidewall 154 and spaced by cable opening 150 therebetween. The dam has a connector segment 160 spaced laterally outwardly of sidewall 154 and connecting leg segments 156 and 158. Leg segments 156 and 158 have respective vertical edges 162 and 164 sealed to sidewall 154, preferably by welding, such parts being steel. Leg segments 156 and 158 and connector segment 160 have respective lower horizontal edges 166, 168, 170 sealed to plate 108, preferably by welding, such parts being steel. First and second leg segments 156 and 158 and connector segment 160 define a perimeter wall of given vertical height. A pulley journal is provided by a pair of L-shaped brackets 172 and 174 welded to sidewall 154 within the noted perimeter wall and journaling pulley 138 over which cable 36 is trained to extend into cable opening 150.

It is recognized that various equivalents, alternatives, and modifications are possible within the scope of the appended claims.

What is claimed is:

1. A driveway truck restraint for blocking the path of travel of an ICC bar at the back of a truck on a driveway at a loading dock, comprising a housing, a ram bar supported by said housing and movable to an upwardly extended lock position to block a forward path of travel of said ICC bar to block forward travel of said truck away from said loading dock, and movable to a downwardly retracted release position permitting forward travel of said truck away from said loading dock, said housing having a hollow column encasing and guiding said ram bar for movement therein, said column having an upper section extending upwardly above said driveway, and having a lower section extending downwardly into said driveway, said housing being fastened to said driveway, and comprising a fore plate section extending horizontally forwardly from said column, and an aft plate section extending horizontally rearwardly from said column, and comprising a first brace extending from said upper section of said column forwardly and downwardly to said fore plate section and compressively resisting forward movement of said upper section of said column and said ram bar in said lock position upon engagement of said ram bar by said ICC bar upon attempted forward travel of said truck away from said loading dock, and comprising a second brace extending from said upper section of said column rearwardly and downwardly to said aft plate section and tensilely resisting forward movement of said upper section of said column and said ram bar in said lock position upon engagement of said ram bar by said ICC bar upon attempted forward travel of said truck away from said loading dock.

2. A driveway truck restraint for blocking the path of travel of an ICC bar at the back of a truck on a driveway at a loading dock, comprising a housing, a ram bar supported by said housing and movable to an upwardly extended lock position to block a forward path of travel of said ICC bar to block forward travel of said truck away from said loading dock, and movable to a downwardly retracted release position permitting forward travel of said truck away from said loading dock, said housing having a hollow column encasing and guiding said ram bar for movement therein, said column having an upper section extending upwardly above said driveway, and having a lower section extending downwardly into said driveway, said housing being fastened to said driveway, and comprising a fore plate section extending horizontally forwardly from said column, and an aft plate section extending horizontally rearwardly from said column, and comprising a longitudinal brace extending forwardly along a longitudinal direction from said upper section of said column and downwardly to said fore plate section, and a lateral cross brace extending laterally along said fore plate section along a direction transverse to said longitudinal direction and maintaining said fore plate section flat along a laterally extended span.

3. The driveway truck restraint according to claim 2 wherein said cross brace is structurally connected to said longitudinal brace and extends in opposite transverse directions therefrom.

4. The driveway truck restraint according to claim 2 wherein said cross brace has a width along said laterally extended span along said transverse direction substantially greater than the width of said upper section of said column along said transverse direction.

5. A driveway truck restraint for blocking the path of travel of an ICC bar at the back of a truck on a driveway at a loading dock, comprising a housing, a ram bar supported by said housing and movable to an upwardly extended lock position to block a forward path of travel of said ICC bar to block forward travel of said truck away from said loading dock, and movable to a downwardly retracted release position permitting forward travel of said truck away from said loading dock, said housing having a hollow column encasing and guiding said ram bar for movement therein, said column having an upper section extending upwardly above said driveway, and having a lower section extending downwardly into said driveway, said housing being fastened to said driveway, and comprising a fore plate section extending horizontally forwardly from said column, and an aft plate section extending horizontally rearwardly from said column, and comprising a pair of longitudinal braces extending rearwardly along a longitudinal direction from said upper section of said column and downwardly to said aft plate section, and a lateral cross brace extending laterally along said aft plate section along a direction transverse to said longitudinal direction and maintaining said aft plate section flat along a laterally extended span.

6. The driveway truck restraint according to claim 5 wherein said cross brace is structurally connected to said longitudinal braces and spans therebetween and extends therebeyond in opposite transverse directions.

7. A driveway truck restraint for blocking the path of travel of an ICC bar at the back of a truck on a driveway at a loading dock, comprising a housing, a ram bar supported by said housing and movable to an upwardly extended lock position to block a forward path of travel of said ICC bar to block forward travel of said truck away from said loading dock, and movable to a downwardly retracted release position permitting forward travel of said truck away from said loading dock, said housing having a hollow column encasing and guiding said ram bar for movement therein, said column having an upper section extending upwardly above said driveway, and having a lower section extending downwardly into said driveway, said housing being fastened to said driveway, and comprising a fore plate section extending from said column horizontally forwardly to a forward set of one or more fastener holes, and an aft plate section extending from said column horizontally rearwardly to a rearward set of one or more fastener holes, and comprising a first brace extending from said upper section of said column forwardly and downwardly to said fore plate section adjacent said forward set of one or more fastener holes and compressively resisting forward movement of said upper section of said column and said ram bar in said lock position upon engagement of said ram bar by said ICC bar upon attempted forward travel of said truck away from said loading dock, and comprising a second brace extending from said upper section of said column rearwardly and downwardly to said aft plate section adjacent said rearward set of one or more fastener holes and tensilely resisting forward movement of said upper section of said column and said ram bar in said lock position upon engagement of said ram bar by said ICC bar upon attempted forward travel of said truck away from said loading dock.

8. A driveway truck restraint for blocking the path of travel of an ICC bar at the back of a truck on a driveway at a loading dock, comprising a housing, a ram bar supported by said housing and movable to an upwardly extended lock position to block a forward path of travel of said ICC bar to block forward travel of said truck away from said loading dock, and movable to a downwardly retracted release position permitting forward travel of said truck away from said loading dock, said housing having a hollow column encasing and guiding said ram bar for movement therein, said column having an upper section extending upwardly above said driveway, and having a lower section extending downwardly into said driveway, said housing being fastened to said driveway, and comprising a fore plate section extending from said column horizontally forwardly to a forward set of one or more fastener holes, and an aft plate section extending from said column horizontally rearwardly to a rearward set of one or more fastener holes, and comprising a longitudinal brace extending forwardly along a longitudinal direction from said upper section of said column and downwardly to said fore plate section, and a lateral cross brace extending laterally along said fore plate section along a direction transverse to said longitudinal direction and maintaining said fore plate section flat along a laterally extended span.

9. The driveway truck restraint according to claim 8 wherein said forward set of one or more fastener holes comprises a pair of fastener holes spaced along said transverse direction, and wherein said cross brace is structurally connected to said longitudinal brace and extends in opposite transverse directions therefrom and spans said pair of fastener holes.

10. The driveway truck restraint according to claim 8 wherein said cross brace has a width along said laterally extended span along said transverse direction substantially greater than the width of said upper section of said column along said transverse direction.

11. A driveway truck restraint for blocking the path of travel of an ICC bar at the back of a truck on a driveway at a loading dock, comprising a housing, a ram bar supported by said housing and movable to an upwardly extended lock position to block a forward path of travel of said ICC bar to block forward travel of said truck away from said loading dock, and movable to a downwardly retracted release position permitting forward travel of said truck away from said loading dock, said housing having a hollow column encasing and guiding said ram bar for movement therein, said column having an upper section extending upwardly above said driveway, and having a lower section extending downwardly into said driveway, said housing being fastened to said driveway, and comprising a fore plate section extending from said column horizontally forwardly to a forward set of one or more fastener holes, and an aft plate section extending from said column horizontally rearwardly to a rearward set of one or more fastener holes, and comprising a pair of longitudinal braces extending rearwardly along a longitudinal direction from said upper section of said column and downwardly to said aft plate section, and a lateral cross brace extending laterally along said aft plate section along a direction transverse to said longitudinal direction and maintaining said aft plate section flat along a laterally extended span.

12. The driveway truck restraint according to claim 11 wherein said cross brace is structurally connected to said longitudinal braces and spans therebetween and extends therebeyond in opposite transverse directions.

13. The driveway truck restraint according to claim 12 wherein said rearward set of one or more fastener holes comprises three fastener holes spaced along said transverse direction, and wherein said cross brace spans two of said fastener holes and not the third.

14. The driveway truck restraint according to claim 13 wherein said three fastener holes comprise a first fastener hole adjacent a first corner of said aft plate section, a second fastener hole at an intermediate portion of said aft plate section, and said third fastener hole adjacent a second corner of said aft plate section, said cross brace spanning said first and second fastener holes and not said third fastener hole.

15. The driveway truck restraint according to claim 12 wherein said rearward set of one or more fastener holes comprises a pair of outboard fastener holes spaced laterally outwardly of said longitudinal braces, and wherein said cross brace spans between said longitudinal braces and one of said outboard fastener holes but not the other.

16. A driveway truck restraint for blocking the path of travel of an ICC bar at the back of a truck on a driveway at a loading dock, comprising a housing anchored to said driveway, a ram bar supported by said housing and movable to an upwardly extended lock position to block a forward path of travel of said ICC bar to block forward travel of said truck away from said loading dock, and movable to a downwardly retracted release position permitting forward travel of said truck away from said loading dock, said housing comprising a hollow column extending downwardly into said driveway, and a plate on top of said driveway and extending laterally horizontally from said column, said ram bar being raised and lowered by a cable system having a cable extending through a cable opening in said column, and comprising a water dam on said plate blocking water inflow to said cable opening, wherein said column has a sidewall having said cable opening extending laterally therethrough, said dam has first and second leg segments extending laterally outwardly from said sidewall and spaced by said cable opening therebetween, and a connector segment spaced laterally outwardly of said sidewall and connecting said first and second leg segments.

17. The driveway truck restraint according to claim 16 wherein said first and second leg segments have vertical edges sealed to said sidewall, and wherein said first and second leg segments and said connector segment have lower horizontal edges sealed to said plate.

18. The driveway truck restraint according to claim 17 wherein said first and second leg segments and said connector segment define a perimeter wall of given vertical height, and comprising a pulley journal within said perimeter wall and journaling a pulley over which said cable is trained to extend into said cable opening.

* * * * *